United States Patent
Watanabe et al.

(10) Patent No.: US 10,778,872 B2
(45) Date of Patent: Sep. 15, 2020

(54) IMAGE PROCESSING APPARATUS AND METHOD

(71) Applicant: TOSHIBA TEC KABUSHIKI KAISHA, Shinagawa-ku, Tokyo (JP)

(72) Inventors: Hiroshi Watanabe, Yokohama Kanagawa (JP); Akihiro Mizutani, Kannami Tagata Shizuoka (JP); Takahiro Hagiwara, Chiba Chiba (JP); Kazuhiro Ogura, Hiratsuka Kanagawa (JP); Kazuhiro Kamimura, Mishima Shizuoka (JP); Yoshinori Sato, Mishima Shizuoka (JP); Hajime Tomizawa, Nagaizumi Sunto Shizuoka (JP); Yusuke Hamada, Mishima Shizuoka (JP); Sho Sakuma, Mishima Shizuoka (JP); Koji Endo, Shimizu Sunto Shizuoka (JP); Ryo Takimura, Nagaizumi Sunto Shizuoka (JP); Takuya Nishigaki, Nagaizumi Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/513,427

(22) Filed: Jul. 16, 2019

(65) Prior Publication Data
US 2019/0342469 A1 Nov. 7, 2019

Related U.S. Application Data

(63) Continuation of application No. 16/003,461, filed on Jun. 8, 2018, now abandoned.

(30) Foreign Application Priority Data

Dec. 22, 2017 (JP) .................................. 2017-246552

(51) Int. Cl.
*H04N 1/00* (2006.01)
*H04N 1/60* (2006.01)

(52) U.S. Cl.
CPC ....... *H04N 1/6047* (2013.01); *H04N 1/00395* (2013.01)

(58) Field of Classification Search
None
See application file for complete search history.

(56) References Cited

U.S. PATENT DOCUMENTS

| 6,400,845 B1 ‡ | 6/2002 | Volino ................. G06K 9/2054 358/462 |
| 7,630,520 B2 ‡ | 12/2009 | Visan ....................... G06K 9/38 382/100 |

(Continued)

FOREIGN PATENT DOCUMENTS

| JP | 2008-263283 A | 10/2008 |
| JP | 2009-193332 A | 8/2009 |

(Continued)

OTHER PUBLICATIONS

Final Office Action on U.S. Appl. No. 16/003,461 dated Apr. 16, 2019.

(Continued)

*Primary Examiner* — Beniyam Menberu
(74) *Attorney, Agent, or Firm* — Foley & Lardner LLP

(57) ABSTRACT

According to one embodiment, an image processing apparatus includes an image reading device, a storage device, and a control unit. The image reading device reads an image on a sheet. The storage device stores information. The control unit that determines a detection area of an encoded image based on a teacher image which is an image read from a predetermined teacher sheet by the image reading device, records information indicating the detection area in the storage device, detects an encoded image in the detection (Continued)

area among the images read from a sheet to be read after the teacher sheet, and decodes the detected encoded image.

12 Claims, 12 Drawing Sheets

(56) References Cited

U.S. PATENT DOCUMENTS

| | | | | |
|---|---|---|---|---|
| 7,703,002 | B2 ‡ | 4/2010 | Barrus | G06F 16/93 715/233 |
| 7,920,714 | B2 ‡ | 4/2011 | O'Neil | G07D 7/206 382/100 |
| 2004/0223197 | A1 ‡ | 11/2004 | Ohta | G06F 17/30271 358/538 |
| 2005/0067496 | A1 ‡ | 3/2005 | Yen | G06K 7/10 235/462.08 |
| 2006/0126101 | A1 ‡ | 6/2006 | Shutt | H04N 1/32614 358/1.15 |
| 2007/0192335 | A1 ‡ | 8/2007 | Sugiura | G06F 16/381 |
| 2007/0199992 | A1 ‡ | 8/2007 | Manheim | G06K 7/10861 235/462.01 |
| 2007/0272753 | A1 ‡ | 11/2007 | Scanlon | G06K 9/346 235/454 |
| 2008/0100877 | A1 ‡ | 5/2008 | Inoue | H07N 1/00355 358/440 |
| 2008/0130946 | A1 ‡ | 6/2008 | Wiersma | B07C 3/14 382/101 |
| 2008/0247294 | A1 ‡ | 10/2008 | Chang | G11B 7/0065 369/103 |
| 2009/0202134 | A1 ‡ | 8/2009 | Kano | G06K 9/2054 382/141 |
| 2010/0116888 | A1 ‡ | 5/2010 | Asami | H06K 7/10722 235/454 |
| 2011/0058228 | A1 ‡ | 3/2011 | Inamoto | G06K 9/2063 358/448 |
| 2011/0063343 | A1 ‡ | 3/2011 | Ito | G06K 7/1443 347/5 |
| 2011/0304879 | A1 ‡ | 12/2011 | Kakutani | G03G 21/046 358/1.15 |
| 2013/0057930 | A1 ‡ | 3/2013 | Toki | B26D 9/00 358/488 |
| 2013/0153663 | A1 ‡ | 6/2013 | Yang | G06K 7/1443 235/462.09 |
| 2014/0036300 | A1 * | 2/2014 | Takahashi | G03G 21/043 358/1.14 |

FOREIGN PATENT DOCUMENTS

| | | |
|---|---|---|
| JP | 2010-182219 A | 8/2010 |
| JP | 2010-288144 A | 12/2010 |

OTHER PUBLICATIONS

Non-Final Office Action on U.S. Appl. No. 16/003,461 dated Oct. 5, 2018.

\* cited by examiner
‡ imported from a related application

FIG. 10
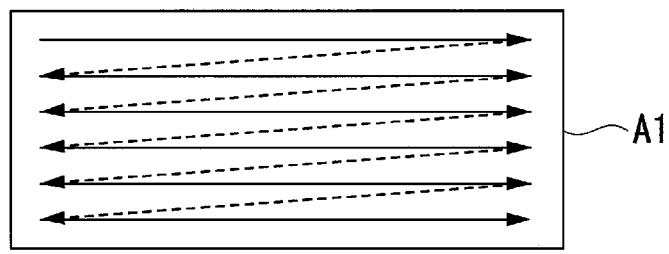
FIG. 11
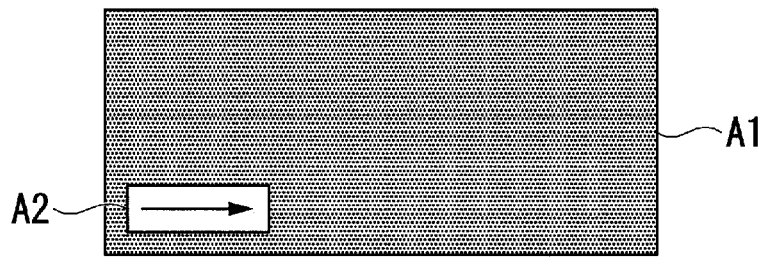
FIG. 12
|        | StartX | StartY | EndX | EndY |
|--------|--------|--------|------|------|
| Area1  | 102    | 504    | 324  | 548  |
| Area2  |        |        |      |      |
| Area3  |        |        |      |      |
| Area4  |        |        |      |      |
| Area5  |        |        |      |      |
| Area6  |        |        |      |      |
| Area7  |        |        |      |      |
| Area8  |        |        |      |      |
| Area9  |        |        |      |      |
| Area10 |        |        |      |      |

```
<Page>
 1
  <Code>
   <StartPosition>
    102, 504
   </StartPosition>
   <EndPosition>
    324, 548
   </EndPosition>
   <Value>
    ABCDWDF
   </Value>
  </Code>
</Page>
```

IMAGE PROCESSING APPARATUS AND METHOD

CROSS-REFERENCE TO RELATED APPLICATIONS

This application is a continuation of, and claims the benefit of priority to, co-pending U.S. patent application Ser. No. 16/003,461 filed on Jun. 8, 2018, which in turn claims the benefit of and priority to Japanese Patent Application No. 2017-246552, filed Dec. 22, 2017, the entire contents of all of which are incorporated herein by reference.

FIELD

Embodiments described herein relate generally to an image processing apparatus and a method.

BACKGROUND

A scanner can read an encoded image formed on a sheet. The encoded image is, for example, a barcode. When reading the barcode formed on the sheet, the scanner detects the barcode by searching the entire area of the sheet. Therefore, it takes time to read the barcode in some cases. Alternatively, a user sets a reading position on the sheet by using a personal computer or the like. The scanner reads the barcode from the reading position on the sheet to be read. In this case, the time for the scanner to read the barcode is shortened. However, the work of setting the reading position is complicated, and it takes time to set up in some cases.

DESCRIPTION OF THE DRAWINGS

FIG. 10 is a view showing barcode detection from entire image information.

FIG. 11 is a view showing barcode recognition when a barcode area portion is masked.

FIG. 12 is a view showing an example of mask variables.

DETAILED DESCRIPTION

Figure 1:
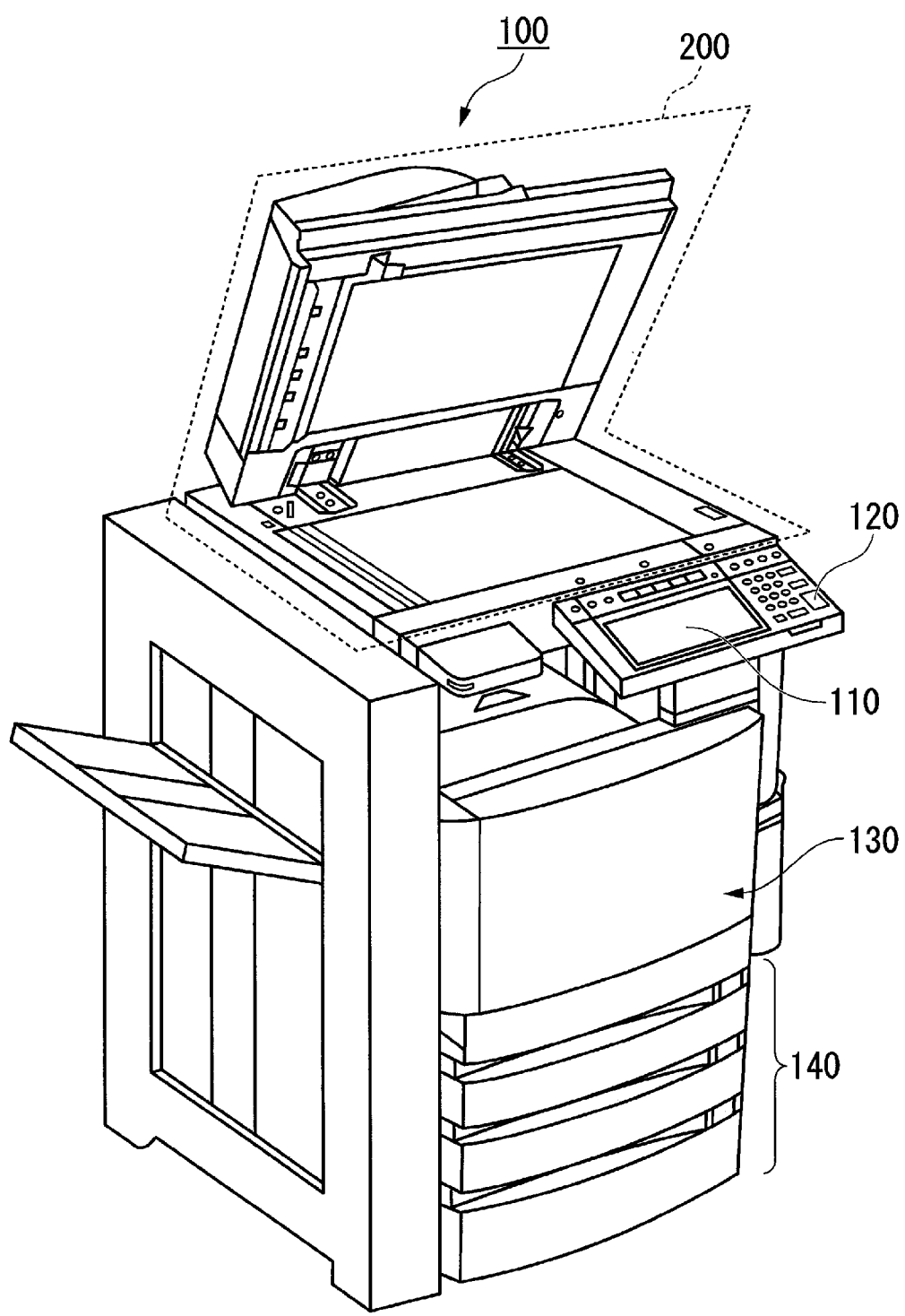
FIG. 1 is an external view showing an overall configuration example of an image processing apparatus according to an embodiment.

An objective of an example embodiment is to provide an image processing apparatus and a method for shortening the time required to read an encoded image from a sheet.

In general, according to some embodiments, the image processing apparatus includes an image reading device, a storage device, and a control unit. The image reading device reads an image on a sheet. The storage device stores information. The control unit that determines a detection area of an encoded image based on a teacher image which is an image read from a predetermined teacher sheet by the image reading device, records information indicating the detection area in the storage device, detects an encoded image in the detection area among the images read from a sheet to be read after the teacher sheet, and decodes the detected encoded image.

Hereinafter, the image processing apparatus and the method of the embodiment will be described with reference to drawings.

The image processing apparatus of the embodiment acquires information from an encoded image formed on a sheet. The encoded image is an image representing encoded information. The image processing apparatus obtains information before encoding by decoding the encoded image by a predetermined decoding rule. Hereinafter, a case where the encoded image is a barcode will be described as an example. The barcode may be a one-dimensional barcode or a two-dimensional barcode.

In many cases, the task of entering a document with a barcode is a routine task. For documents with barcodes, the same form (template) is often used. Therefore, the image processing apparatus of the embodiment detects a position or an area where a barcode is formed from one of these documents and identifies a barcode area based on the detection result. For other documents, the image processing apparatus recognizes an image included in the identified barcode area by the barcode. That is, the image processing apparatus performs the following processing.

(1) The image processing apparatus performs a scan job of a teacher original document. The teacher original document is the original document used to identify a barcode area. The image processing apparatus detects the position or area of the barcode in the scanned page and identifies the barcode area. In the subsequent scan job of the original document to be read, the image processing apparatus performs barcode recognition on the image of the barcode area identified by using the teacher original document and does not perform barcode recognition on the image outside the barcode area.

(2) When scanning a plurality of pages of original documents, the image processing apparatus detects the position or area of the barcode on a first page and identifies the barcode area. For the pages after the first page, the image processing apparatus performs barcode recognition on the image of the barcode area identified by using the first page and does not perform barcode recognition on images outside the barcode area.

As described above, the image processing apparatus does not need to search the barcode from the entire page of the original document to be read. Therefore, it is faster to read the barcode than when the barcode is searched from the entire area on the page. In addition, when an image similar to the barcode is included in the original document to be read, the possibility of erroneous recognition by the image processing apparatus may also be reduced.

FIG. 1 is an external view showing an overall configuration example of an image processing apparatus 100 according to the embodiment. The image processing apparatus 100 is, for example, a multi-function peripheral. The image processing apparatus 100 operates as a barcode scanner. The image processing apparatus 100 includes a display 110, a control panel 120, a printer 130, a sheet accommodating unit 140, and an image reading unit 200. The printer 130 of the image processing apparatus 100 may be an apparatus that fixes a toner image or an ink jet type apparatus.

The image processing apparatus 100 reads an image appearing on a sheet, generates digital data, and generates an image file. The sheet is, for example, an original document, paper on which characters, images, and the like are described. The sheet may be anything that may be read by the image processing apparatus 100.

The display 110 is an image display apparatus such as a liquid crystal display or an organic electroluminescence (EL) display. The display 110 displays various information on the image processing apparatus 100.

The control panel 120 has a plurality of buttons. The control panel 120 receives a user's operation. The control panel 120 outputs a signal corresponding to the operation performed by the user to the control unit of the image processing apparatus 100. The display 110 and the control panel 120 may be configured as an integral touch panel.

The printer 130 forms an image on a sheet based on the image information generated by the image reading unit 200 or the image information received via a communication path. The printer 130 forms an image by the following processing, for example. An image forming unit of the printer 130 forms an electrostatic latent image on a photoconductive drum based on the image information. The image forming unit of the printer 130 forms a visible image by attaching a developer to the electrostatic latent image. A specific example of the developer is a toner. A transfer unit of the printer 130 transfers the visible image onto the sheet. A fixing unit of the printer 130 fixes the visible image on the sheet by heating and pressurizing the sheet. The sheet on which the image is formed may be a sheet stored in the sheet accommodating unit 140 or may be a sheet pointed by hand.

The sheet accommodating unit 140 accommodates a sheet used for image formation in the printer 130.

The image reading unit 200 reads image information to be read as light and shade of light. The image reading unit 200 records the read image information. The recorded image information may be transmitted to another information processing device via the network. The recorded image information may be formed on the sheet by the printer 130.

Figure 2:
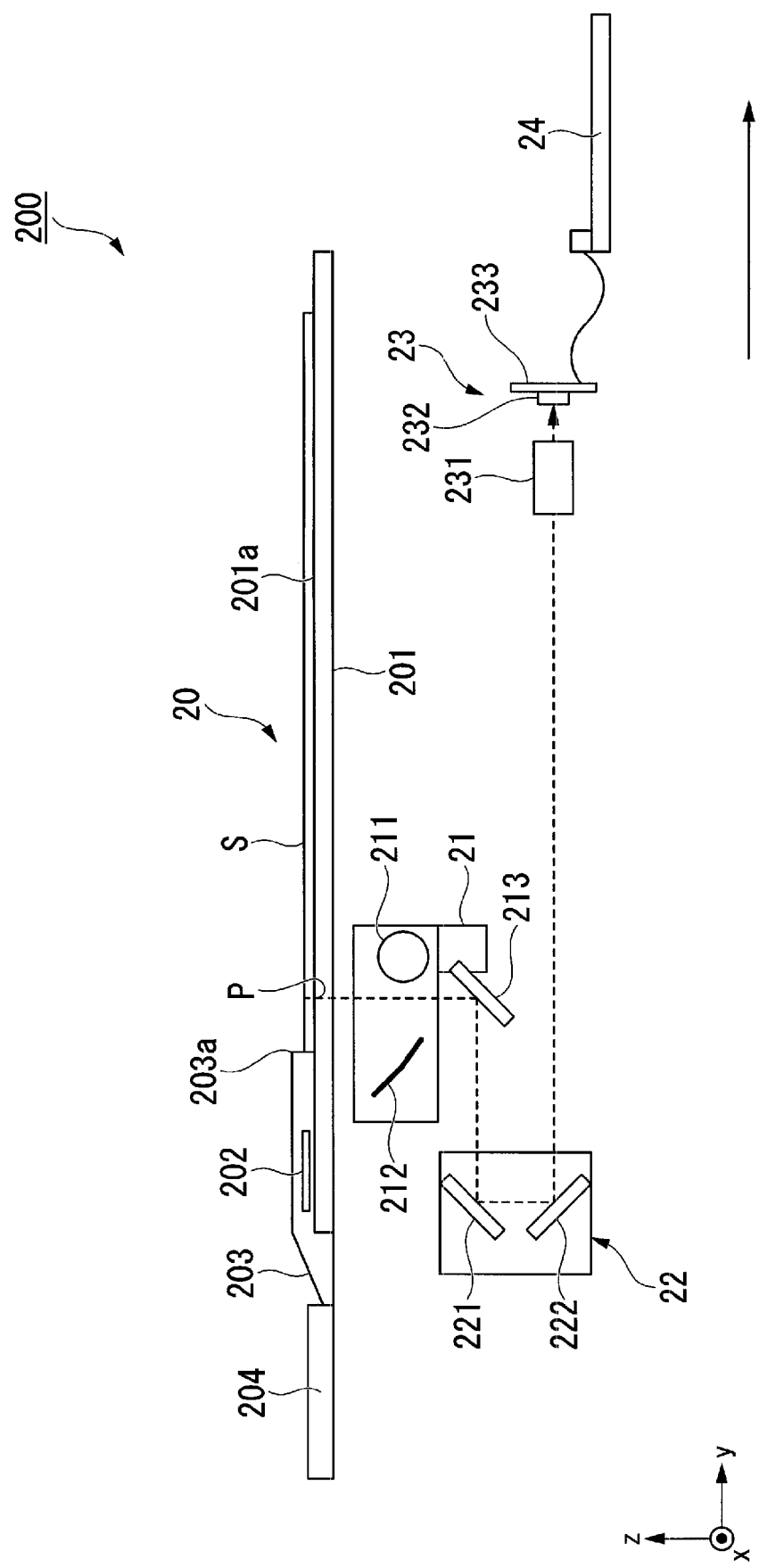
FIG. 2 is a schematic view showing a configuration example of an image reading unit.

FIG. 2 is a schematic view showing a configuration example of the image reading unit 200.

The image reading unit 200 includes an original document table 20, a first carriage 21, a second carriage 22, an imaging unit 23, and an image reading control unit 24. The original document table 20 may be provided with an automatic document feeder (ADF). The direction in which the first carriage 21 moves is a sub-scanning direction y. In the original document table 20, the direction orthogonal to the sub-scanning direction y is a main scanning direction x. The direction orthogonal to the main scanning direction x and the sub-scanning direction y is a height direction z.

The original document table 20 includes an original document table glass 201, a shading plate 202, an original document scale 203, and a through lead glass 204.

The original document table glass 201 has a placement surface 201a on which a sheet S is placed. The shading plate 202 is constituted by a white member. The shading plate 202 has white as a reference at the time of shading correction for an image (hereinafter, referred to as "read image") read from the sheet S. The shading plate 202 has a long shape in the main scanning direction x. The original document scale 203 shows the position of the sheet S placed on the original document table glass 201. At the end of the original document scale 203, a front-end reference portion 203a is provided. The front-end reference portion 203a forms a step difference with the placement surface 201a of the original document table glass 201, thereby forming a convex portion for pressing the end portion of the sheet S. The position of the sheet S is determined by being pressed against the front-end reference portion 203a on the original document table glass 201. On the placement surface 201a, the position for placing the corner of the front-end of the sheet S is predetermined. By positioning the corner of the front-end of the sheet S at a predetermined position, the main scanning direction x and the sub-scanning direction y are positioned.

The first carriage 21 includes a light source 211, a reflector 212, and a first mirror 213. The light source 211 emits light. The reflector 212 reflects the light emitted from the light source 211. The light reflected by the reflector 212 is uniformly irradiated on the shading plate 202 and the sheet S. Based on the reflected light of the irradiated light, the light distribution characteristic of the main scanning direction x at a reading position of the sheet S is adjusted. The first mirror 213 reflects the light reflected by the shading plate 202 and the sheet S toward the second mirror 221 of the second carriage 22.

The second carriage 22 includes a second mirror 221 and a third mirror 222. The second mirror 221 reflects the light reflected by the first mirror 213 to the third mirror 222. The third mirror 222 reflects the light reflected by the second mirror 221 to a condensing lens 231 of the imaging unit 23.

The imaging unit 23 includes the condensing lens 231, a CCD sensor 232, and a CCD substrate 233. The condensing lens 231 collects the light reflected by the third mirror 222. The condensing lens 231 forms an image of the condensed light on an imaging surface (reading surface) of the CCD sensor 232. The CCD sensor 232 is mounted on the CCD substrate 233. For example, the CCD sensor 232 is a hybrid four-line sensor. The hybrid four-line sensor includes a three-line sensor that reads a color image and a one-line sensor that reads a monochrome image. The three-line sensor reads light of R (red), G (green) and B (blue). The CCD sensor 232 converts light formed by the condensing lens 231 into electric charge. By this conversion, the CCD sensor 232 converts the image formed by the condensing lens 231 into an electric signal. The CCD substrate 233 generates image data based on an electric signal generated by photoelectric conversion of the CCD sensor 232. When generating the image data, the CCD substrate 233 generates image data by using the correction information previously obtained by the shading correction. The CCD substrate 233 outputs the generated image data to the image reading control unit 24. The above-described processing performed by the CCD substrate 233 is executed by the analog front end (AFE) mounted on the CCD substrate 233.

The image reading control unit 24 controls the first carriage 21, the second carriage 22, and the imaging unit 23. For example, the image reading control unit 24 controls the movement of the first carriage 21, the turning on and off of the light source 211 of the first carriage 21. For example, the image reading control unit 24 controls the operation of the imaging unit 23.

The first carriage 21 moves in the sub-scanning direction y according to the control of the image reading control unit 24. As the first carriage 21 moves, the second carriage 22 moves at a speed of ½ in the same direction as that of the first carriage 21. Through this operation, even when the first carriage 21 moves, the optical path length of the light reaching the imaging surface of the CCD sensor 232 does not change. That is, the optical path length of the light in an optical system constituted by the first mirror 213, the second mirror 221, the third mirror 222, and the condensing lens 231 is constant. In other words, the optical path length from the placement surface 201a to the imaging surface of the CCD sensor 232 is constant.

For example, in the example of FIG. 2, the first carriage 21 moves from left to right along the sub-scanning direction y. As the first carriage 21 moves in the sub-scanning direction y, a reading position P with respect to the sheet S also moves. Therefore, the reading position P moves from left to right along the sub-scanning direction y. The reading position P is a position corresponding to one line of the main scanning direction x. As the reading position P moves in the sub-scanning direction y, the image of the reading position P of the sheet S is sequentially formed on the imaging surface of the CCD sensor 232. The CCD sensor 232 outputs a signal corresponding to the image of the imaged reading position P as a signal for one line of the main scanning direction x. The CCD substrate 233 generates image data of the entire sheet S based on signals of a plurality of lines.

Figure 3:
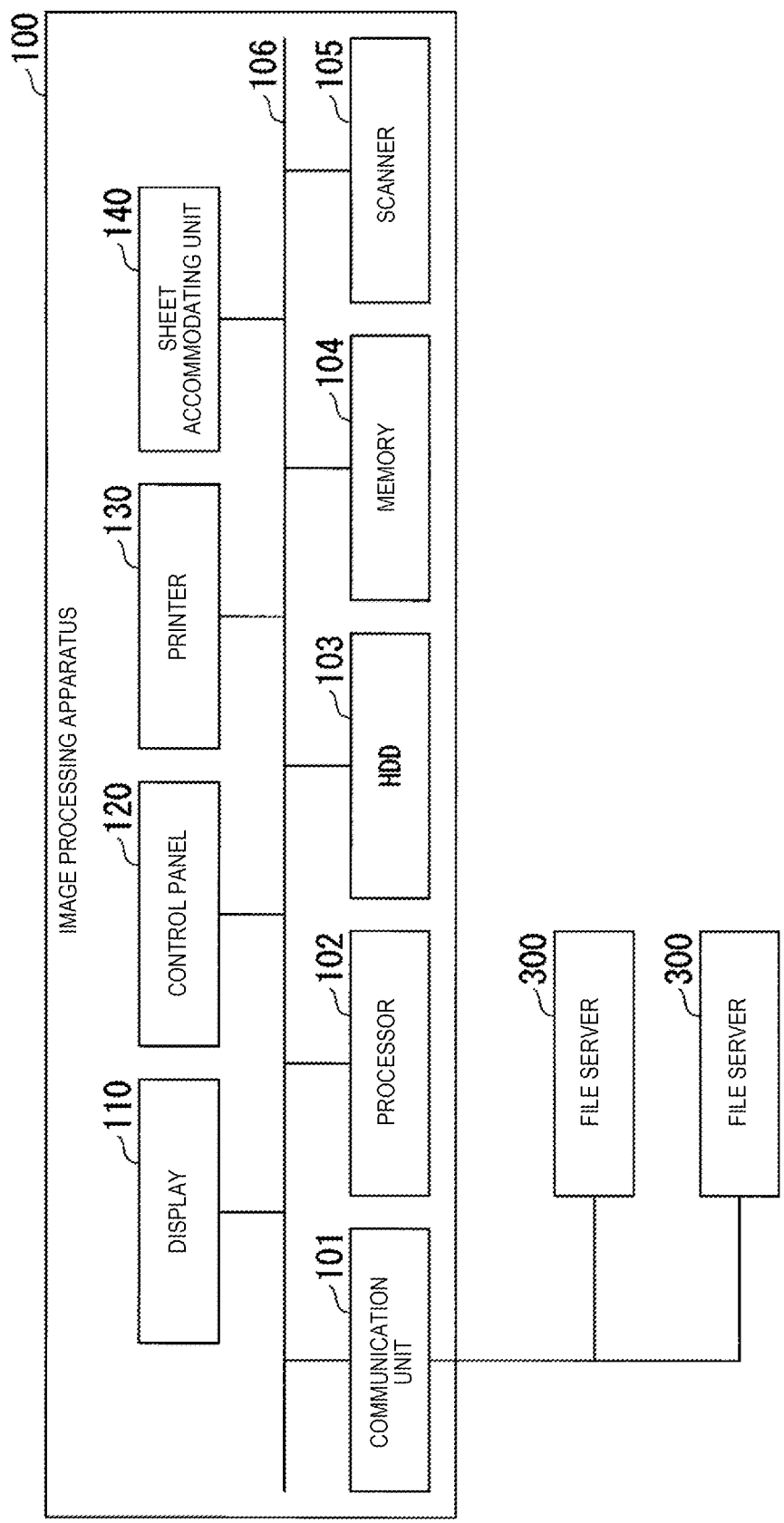
FIG. 3 is a block view showing a configuration of the image processing apparatus.

FIG. 3 is a block view showing a configuration of the image processing apparatus 100 according to the embodiment. The image processing apparatus 100 includes a communication unit 101, a processor 102, a hard disk drive (HDD) 103, a memory 104, a scanner 105, a display 110, a control panel 120, a printer 130, and a sheet accommodating unit 140. The communication unit 101, the processor 102, the HDD 103, the memory 104, the scanner 105, the display 110, the control panel 120, the printer 130, and the sheet accommodating unit 140 are connected by a bus 106. Since the configuration of the display 110, the control panel 120, the printer 130, and the sheet accommodating unit 140 are as described above, the description thereof will be omitted.

The communication unit 101 is a network interface. The communication unit 101 communicates with the information processing apparatus via a communication path. The information processing apparatus is, for example, a personal computer, a server, or the like. In this view, a file server 300 is shown as an information processing apparatus.

The processor 102 is, for example, a central processing unit (CPU). When the power of the image processing apparatus 100 is turned on, the processor 102 loads the program stored in the HDD 103 into the memory 104. The processor 102 executes the program loaded in the memory 104. By executing the program, the processor 102 operates as a control unit 10 shown in FIG. 4 to be described later.

The HDD 103 is an auxiliary storage device. The HDD 103 stores programs and various data. The memory 104 is a main storage device. The memory 104 is, for example, a random access memory (RAM). The memory 104 stores data to be directly referred to when the processor 102 executes processing.

The scanner 105 (image reading device) reads an image on a sheet. The scanner 105 is realized by the image reading unit 200 in FIG. 1.

Figure 4:
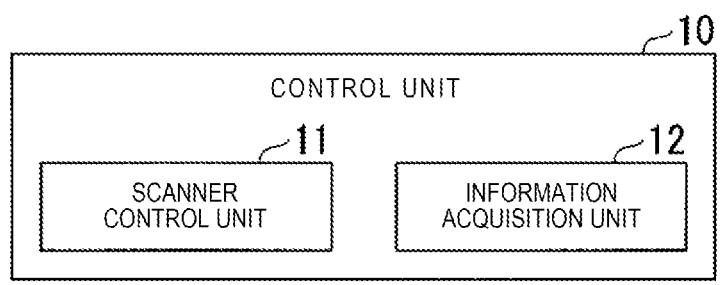
FIG. 4 is a functional block view of a control unit.

FIG. 4 is a functional block view of the control unit 10. In this view, functional blocks related to the present embodiment are extracted and shown. The control unit 10 controls each unit of the image processing apparatus 100. The control unit 10 includes a scanner control unit 11 and an information acquisition unit 12.

The scanner control unit 11 controls the scanner 105. The scanner control unit 11 includes the function of the image reading control unit 24 shown in FIG. 2. The information acquisition unit 12 determines a detection area of an encoded image based on a teacher image which is an image read from a predetermined teacher sheet by the scanner 105. The teacher sheet is a sheet different from the sheet to be read. Alternatively, the teacher sheet is a part of sheets included in the plurality of pages of sheets to be read. The information acquisition unit 12 records information indicating the detection area of the encoded image in the HDD 103. The information acquisition unit 12 detects an encoded image with respect to the detection area in the image of the sheet to be read by the scanner 105 after the teacher sheet. The information acquisition unit 12 decodes the detected encoded image.

Next, an operation outline of the image processing apparatus 100 will be described.

First, the information acquisition unit 12 of the image processing apparatus 100 displays a barcode scan execution screen on the display 110.

Figure 5:
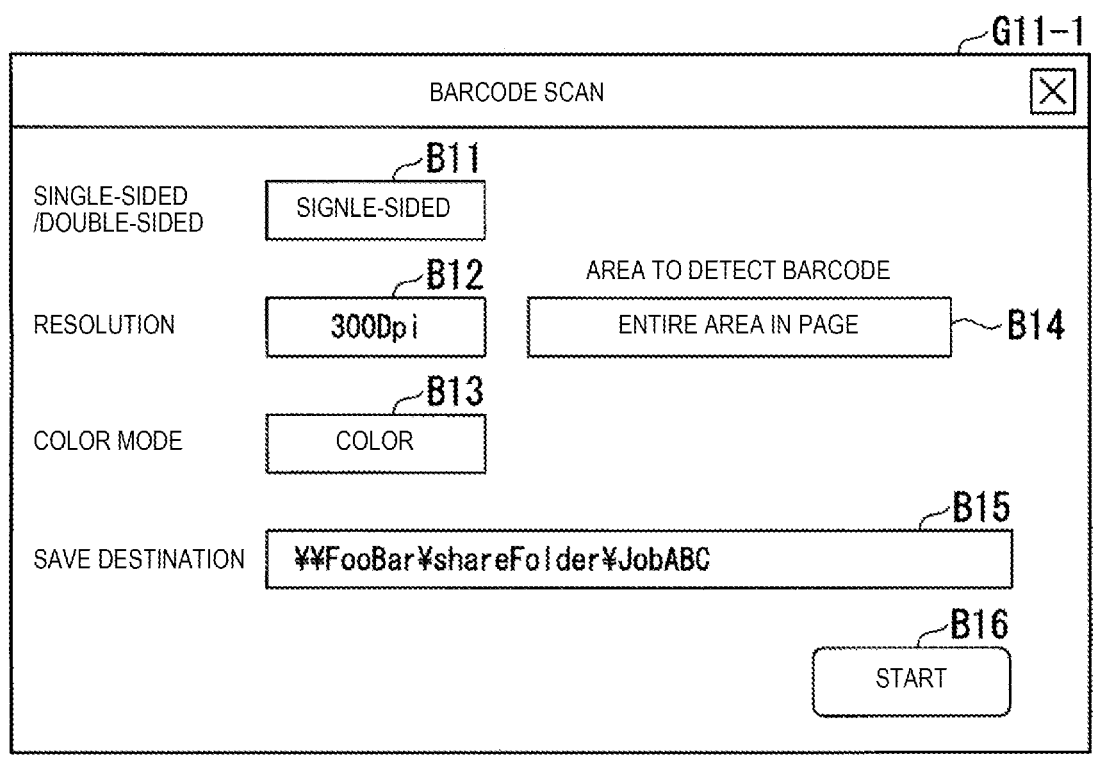
FIG. 5 is a view showing a display example of a barcode scan execution screen.
Figure 6:
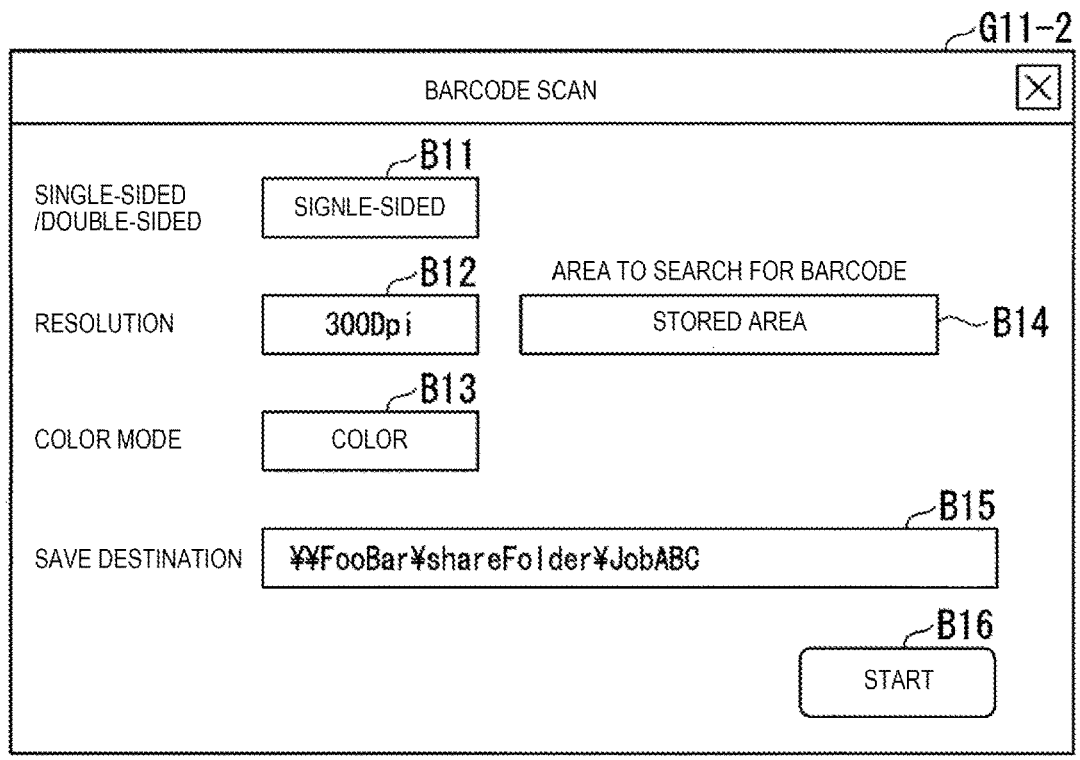
FIG. 6 is a view showing a display example of the barcode scan execution screen.
Figure 7:
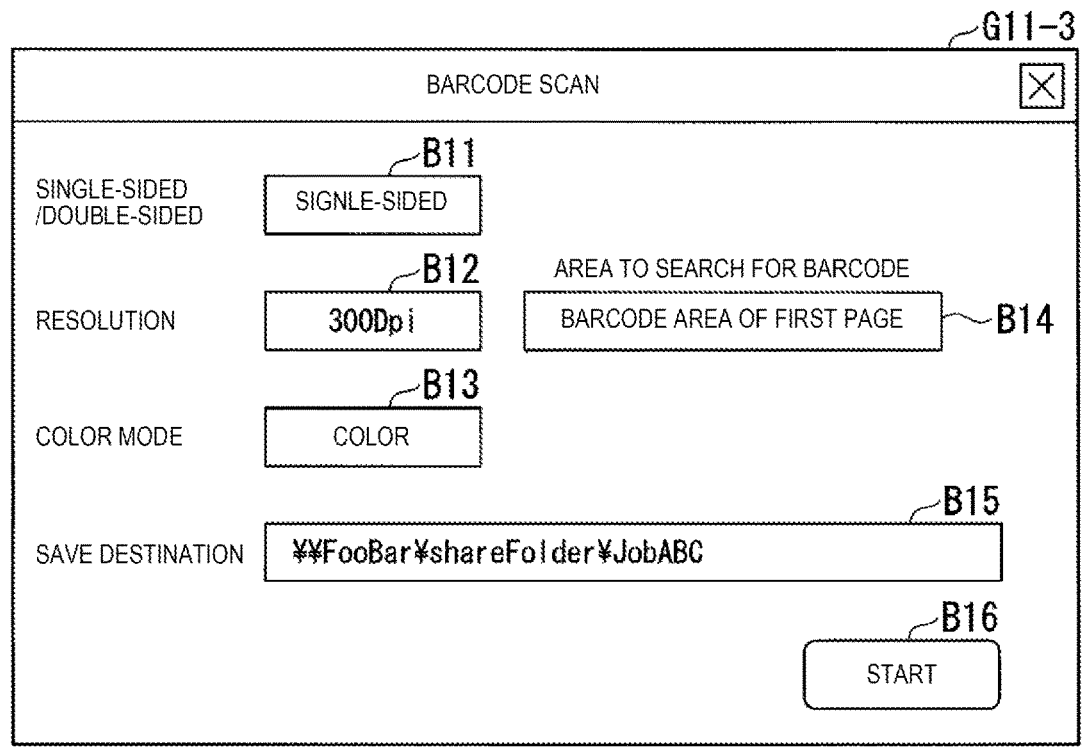
FIG. 7 is a view showing a display example of the barcode scan execution screen.

FIGS. 5, 6, and 7 are diagrams showing display examples of the barcode scan execution screen. The barcode scan execution screen G11-1 shown in FIG. 5, the barcode scan execution screen G11-2 shown in FIG. 6, and the barcode scan execution screen G11-3 shown in FIG. 7 include a single-sided/double-sided setting button B11, a resolution setting button B12, a color mode setting button B13, a barcode detection area setting button B14, a save destination setting button B15, and a start button B16. The contents of current settings are displayed on the buttons B11 to B15. In the following description, the barcode scan execution screens G11-1, G11-2, and G11-3 are collectively referred to as a barcode scan execution screen G11.

The single-sided/double-sided setting button B11 is a button for setting whether to scan one side of the original document or to scan both sides. The resolution setting button B12 is a button for setting the resolution of scanning. The color mode setting button B13 is a button for setting whether to perform scanning in color or in black and white.

The barcode detection area setting button B14 is a button for setting a barcode detection area. The barcode scan execution screen G11-1 shows a case where the setting of a current barcode detection area is "entire area in the page". The "entire area in the page" indicates a setting in which the barcode area is detected by scanning the entire page of the original document. The barcode scan execution screen G11-2 shows a case where the setting of the current barcode detection area is "stored area".

The "stored area" indicates a setting in which the barcode area in the page is detected and stored by using the teacher original document and the barcode of the original document to be scanned is readout from the stored barcode area. The barcode scan execution screen G11-3 shows a case where the setting of the current barcode detection area is "Barcode area of the first page". "Barcode area of the first page" is a setting in which the entire page of the first page of the plurality of pages of the original documents is scanned, the barcode area is detected, and the detected barcode area is applied to the second and subsequent pages.

The save destination setting button B15 is a button for setting the save destination of the scan result data. The save destination is, for example, a shared folder of the file server 300. The start button B16 is a button for instructing the barcode scanning start of the original document.

Figure 8:
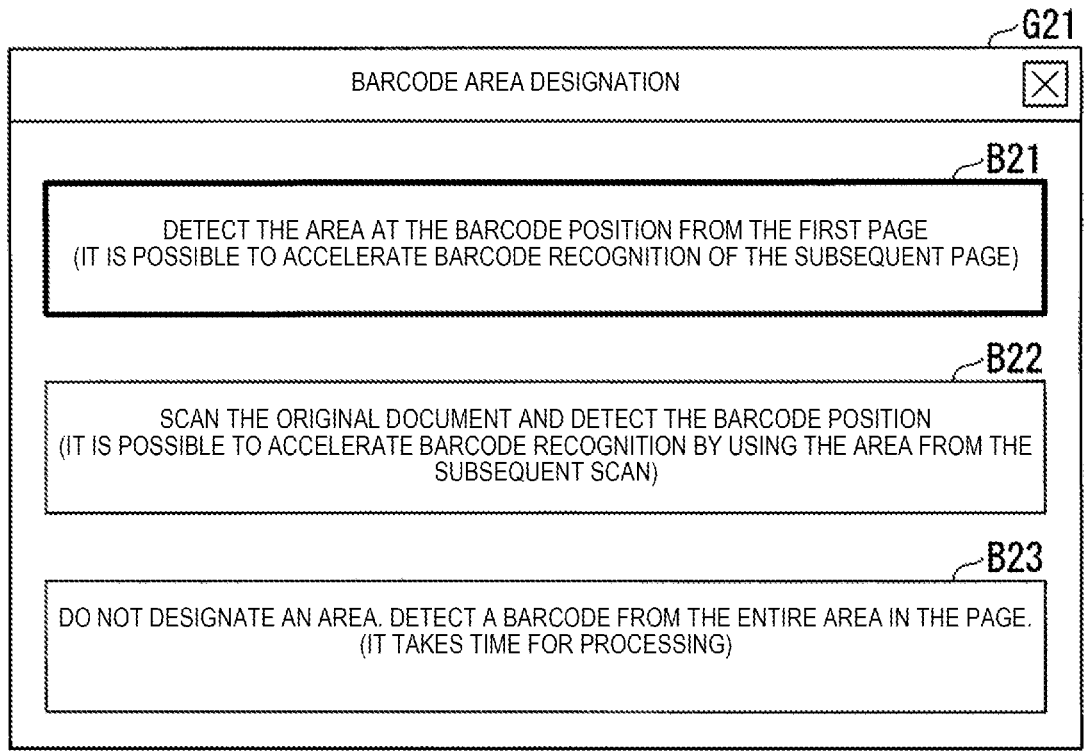
FIG. 8 is a view showing a display example of a barcode area designation screen.

FIG. 8 is a view showing a display example of a barcode area designation screen G21. When detecting that the user presses the barcode detection area setting button B14 in the barcode scan execution screen G11, the information acquisition unit 12 displays the barcode area designation screen G21 shown in this view on the display 110. The barcode area designation screen G21 includes buttons B21 to B23 for designating an area for detecting a barcode. The button B21 is a button for designating "Detect the area at the barcode position from the first page". The button B22 is a button for designating "Scan the original document and detect the barcode position". The button B23 is a button for designating "Do not designate an area. Detect a barcode from the entire area in the page".

When the user presses any one of the buttons B21 to B23, the information acquisition unit 12 saves the setting designated by the pressed button in the HDD 103. In the barcode area designation screen G21, when "Scan the original document and detect the barcode position" is selected by button B22, the information acquisition unit 12 displays the teacher original document barcode scan execution screen on the display 110.

Figure 9:
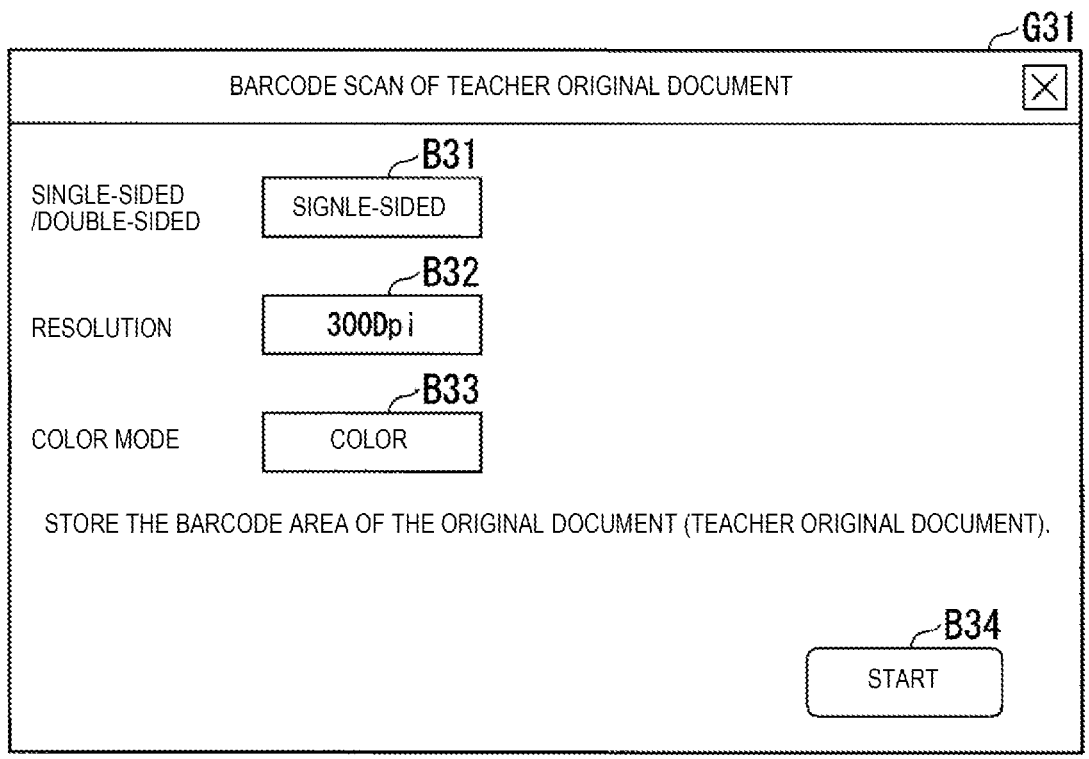
FIG. 9 is a view showing a display example of a teacher original document barcode scan execution screen.

FIG. 9 is a view showing a display example of the teacher original document barcode scan execution screen G31. The teacher original document barcode scan execution screen G31 is a screen for instructing the execution of scanning of the teacher original document. In the teacher original document scan, the scanner 105 reads a specific original document as the teacher original document in order to designate the barcode area. The information acquisition unit 12 detects the position of barcode from the scan result of the teacher original document and sets the position as the barcode area.

The teacher original document barcode scan execution screen G31 includes a single-sided/double-sided setting button B31, a resolution setting button B32, a color mode setting button B33, and a start button B34. The contents of current settings are displayed on the buttons B31 to B33. The single-sided/double-side setting button B31 is a button for setting whether to scan one side of the original document or to scan both sides. The resolution setting button B32 is a button for setting the resolution of scanning. The color mode setting button B33 is a button for setting whether to perform scanning in color or in black and white. The start button B34 is a button for instructing the barcode scanning start of the teacher original document.

In the teacher original document barcode scan execution screen G31, the user performs scan reading setting (setting of single-sided/double-sided, resolution, and color mode). The user places the teacher original document on the placement surface 201a and presses the start button B34. The scanner control unit 11 detects the start button B34 being pressed and reads the original document by scanning according to the reading setting. The information acquisition unit 12 detects the barcode from the entire area of the image information obtained by the scanning and determines the barcode as a barcode area. Thereafter, the information acquisition unit 12 displays the barcode scan execution screen G11-2 (FIG. 6) on the display 110.

The user sets the original document to be read on the placement surface 201a and presses the start button B16 of the barcode scan execution screen G11-2. When detecting the start button B16 being pressed, the scanner control unit 11 controls the scanner 105 to read the original document to be read. The information acquisition unit 12 masks the barcode area portion in the image information of each read page and extracts the image information in the barcode area. The information acquisition unit 12 recognizes the extracted image information by the barcode. The information acquisition unit 12 sets the barcode recognition result in a barcode file. The scanner control unit 11 saves the barcode file in the save destination in association with the entire image files including the entire image information of each page of the original document to be read. The save destination is a shared folder of the file server 300 set in the barcode scan execution screen G11.

FIG. 10 is a view showing barcode detection from the entire image information. In this view, barcode detection of the entire page is performed by repeating the search from the left side to the right side of image information A1 stored in the HDD 103 in order from the top to the bottom of the image information A1.

FIG. 11 is a view showing barcode recognition when the barcode area portion is masked. The masking prioritizes reading (e.g., reading first or reading only) the image information included in a barcode area A2 of the image information A1 stored in the HDD 103 as an area for barcode recognition. As shown in this view, the area to be recognized as a barcode may be made smaller than the entire page by the mask. Therefore, compared with the case where barcode detection is performed from the entire image information (FIG. 10), the time required for barcode data recognition processing may be shortened.

FIG. 12 is a view showing an example of mask variables to be used as a mask of the barcode area portion. The mask variables shown in this view represents the barcode area in the image area by using XY coordinates in a XY plane with a predetermined position of the image area as an origin. The upper left corner of the rectangular barcode area is a start position and the lower right corner is an end position. StartX is the X coordinate of the starting position, StartY is the Z coordinate of the starting position, EndX is the X coordinate of the ending position, and EndY is the Y coordinate of the ending position. In this view, a setting example when there is one barcode area in the original document is shown. When there area plurality of barcode areas in the original document, the XY coordinates of the start position and the end position of each barcode area are set in each of Area 1, Area 2, and . . . .

Figures 13, 14:
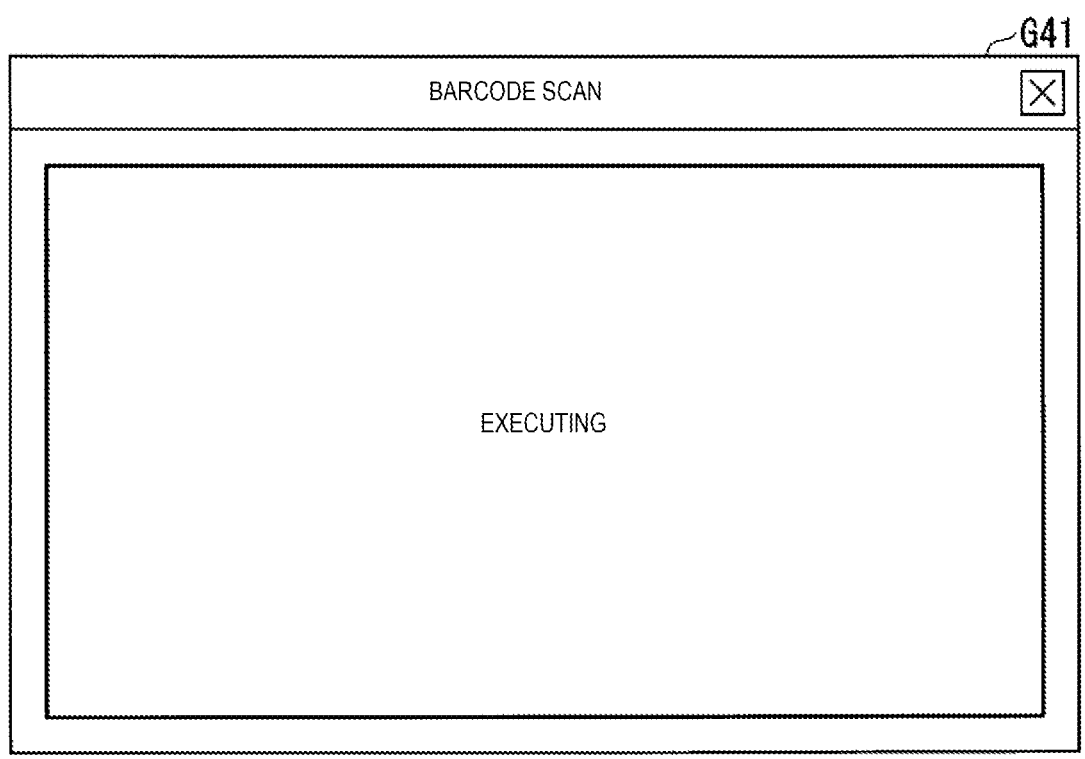
FIG. 13 is a view showing an example of barcode data.
FIG. 14 is a view showing a display example of a screen during execution of processing.

FIG. 13 is a view showing an example of the barcode data set in the barcode file. The barcode data shown in this view includes a page (Page) of the original document, a start position (Start Position) and an end position (End Position) of the barcode area, and a barcode recognition result (Value). The barcode file contains barcode data of each page of the original document to be read.

FIG. 14 is a view showing a display example of a processing in progress screen G41. While the scan for the original document to be read is being executed after the start button B16 is pressed, the information acquisition unit 12 displays the processing in progress screen shown in this view on the display 110.

In the barcode area designation screen G2 shown in FIG. 8, when the user selects "Detect the area at the barcode position from the first page" with the button B21, the image processing apparatus 100 operates as follows. The information acquisition unit 12 displays the barcode scan execution screen G11-3 (FIG. 7) on the display 110. The user sets the original document to be read on the placement surface 201a and presses the start button B16 of the barcode scan execution screen G11-3. During the processing after the start button B16 is pressed, the scanner control unit 11 displays the processing in progress screen G41 (FIG. 14) on the display 110. The scanner control unit 11 controls the scanner 105 to continuously scan the plurality of pages of original documents to be read. The information acquisition unit 12 treats the first page as the teacher original document, extracts the barcode area from the image information of the first page, and generates mask variables. The information acquisition unit 12 masks the image information by using the barcode area indicated by the mask variables and extracts the image information in the barcode area to recognize the barcode from the second and subsequent pages. Information acquisition unit 12 sets the barcode recognition result in the barcode file in the same manner as above. The information acquisition unit 12 saves the barcode file and the entire image file including the entire image information of each page in association with each other in a shared folder of the file server 300.

In addition, in the barcode area designation screen G21 shown in FIG. 8, when the user selects "Do not designate an area. Detect a barcode from the entire area in the page" with the button B23, the image processing apparatus 100 operates as follows. The information acquisition unit 12 displays the barcode scan execution screen G11-1 (FIG. 6) on the display 110. The user sets the original document to be read on the placement surface 201a and presses the start button B16 of the barcode scan execution screen G11-1. The information acquisition unit 12 searches the images of each page of the original document to be read, detects a barcode, and performs barcode recognition without using the information of the barcode area and masking the image information scanned by the scanner control unit 11. The information acquisition unit 12 sets the barcode recognition result in the barcode file in the same manner as above. The information acquisition unit 12 saves the barcode file and the entire image file including the entire image information of each page in association with each other in a shared folder of the file server 300.

Next, the processing flow of the image processing apparatus 100 will be described.

Figure 15:
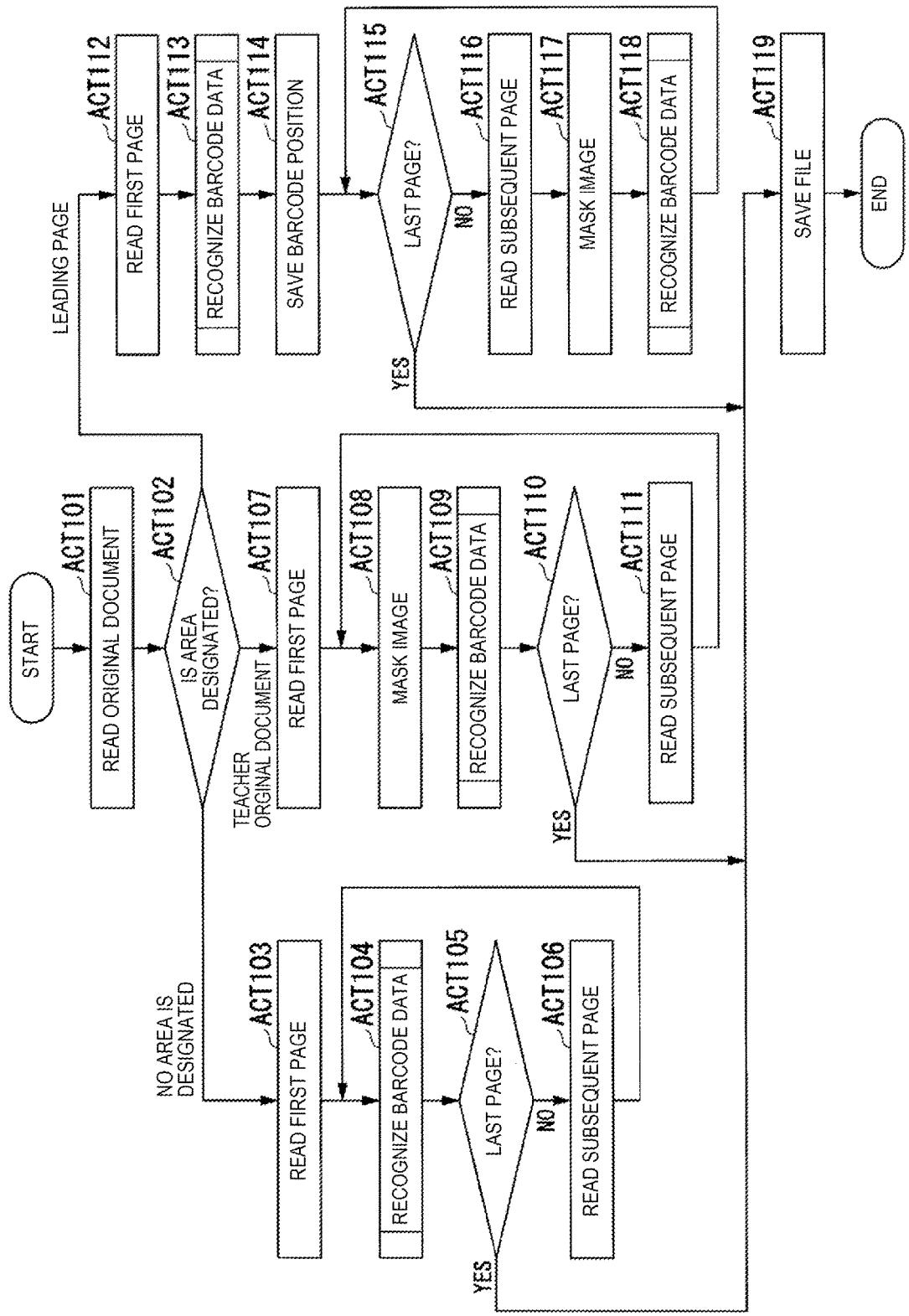
FIG. 15 is a flowchart showing barcode scanning.

FIG. 15 is a flowchart showing barcode scanning. This view is a main flow of barcode scanning performed by the control unit 10.

The scanner control unit 11 detects the start button B16 being pressed in the barcode scan execution screen G11. The scanner control unit 11 obtains scan settings set by the user in the barcode scan execution screen G11. The scanner control unit 11 switches the display on the display 110 to the processing in progress screen G41 (FIG. 14). The scanner control unit 11 controls the scanner 105 to read the original document according to the scan settings. The scanner control unit 11 converts the image information read by the scanner 105 into an electronic file for each page and saves the file in the HDD 103 (ACT 101).

The information acquisition unit 12 branches the processing according to the barcode detection area set by the user in the barcode area designation screen G21 (ACT 102). When the information acquisition unit 12 determines that "Do not designate an area. Detect a barcode from the entire area in the page" is set (ACT 102: no area designated), the processing proceeds to ACT 103. When the information acquisition unit 12 determines that "Scan the original document and detect the barcode position" is set (ACT 102: teacher original document), the processing proceeds to ACT 107. When the information acquisition unit 12 determines that "Detect the area at the barcode position from the first page" is set (ACT 102: first page), the processing proceeds to ACT 112.

When the processing branches to a route without area designation in the ACT 102, the information acquisition unit 12 reads image information from the HDD 103 and holds the image information in the memory 104. The information acquisition unit 12 reads the file of the first page (leading page) from the image information (ACT 103). The information acquisition unit 12 performs barcode data recognition processing on the entire area of the current page indicated by the read file as an area to be recognized as a barcode (ACT 104). The barcode data recognition processing will be described in detail in FIG. 16, which will be described later. The information acquisition unit 12 obtains barcode data in which the result of barcode data recognition processing is set. The information acquisition unit 12 adds barcode data to the barcode file in XML format to be stored in the HDD 103 according to the data format shown in FIG. 13 and save the file.

The information acquisition unit 12 determines whether or not the current page is a last page (ACT 105). If it is determined that the current page is not the last page (ACT 105: NO), the information acquisition unit 12 reads the file of the next page of the current page from the image information stored in the memory 104 (ACT 106). The information acquisition unit 12 repeats the processing from the ACT 104. Then, if it is determined that the current page is the last page in ACT 105 (ACT 105: YES), the information acquisition unit 12 proceeds to ACT 119.

When the processing branches to a route of the teacher original document in ACT 102, the information acquisition unit 12 reads the mask variables saved in the teacher original document reading executed in advance from the HDD 103. The teacher original document reading will be described in detail with reference to FIG. 16, which will be described later. Further, the information acquisition unit 12 reads the image information from the HDD 103 and holds the information in the memory 104. The information acquisition unit 12 reads the file of the first page (leading page) from the image information (ACT 107). The information acquisition unit 12 masks the read image file by using the mask variables and extracts the barcode area image (ACT 108). The information acquisition unit 12 obtains the barcode data by performing the barcode data recognition processing of FIG. 16 which will be described later with the extracted image as a barcode recognition target area (ACT 109). The information acquisition unit 12 adds barcode data to the barcode file in the XML format to be stored in the HDD 103 according to the data format shown in FIG. 13 and save the file.

The information acquisition unit 12 determines whether or not the current page is the last page (ACT 110). If it is determined that the current page is not the last page (ACT 110: NO), the information acquisition unit 12 reads the file of the next page of the current page from the image information stored in the memory 104 (ACT 111). The information acquisition unit 12 repeats the processing from the ACT 108. Then, if it is determined that the current page is the last page in ACT 110 (ACT 110: YES), the information acquisition unit 12 proceeds to ACT 119.

When the processing branches to a route of the first page in ACT 102, the information acquisition unit 12 reads the image information from the HDD 103 and holds the image information in the memory 104. The information acquisition unit 12 reads the file of the first page (leading page) from the image information (ACT 112). The information acquisition unit 12 obtains the barcode data by performing the barcode data recognition processing of FIG. 16 which will be described later, with the entire area of the first page indicated by the read file as a barcode recognition target area (ACT 113). The information acquisition unit 12 adds barcode data to the barcode file in the XML format to be stored in the HDD 103 according to the data format shown in FIG. 13 and save the file. Further, the information acquisition unit 12 generates mask variables based on the information of the position where the barcode is detected in the ACT 113 and holds the variables in the memory 104 (ACT 114).

The information acquisition unit 12 determines whether or not the current page is the last page (ACT 115). If it is determined that the current page is not the last page (ACT 115: NO), the information acquisition unit 12 reads the file of the next page of the current page from the image information stored in the memory 104 (ACT 116). The information acquisition unit 12 masks and extracts the barcode area image by using the mask variables generated in ACT 114 (ACT 117) into the read image file. The information acquisition unit 12 obtains the barcode data by performing the barcode data recognition processing of FIG. 16 which will be described later with the extracted image as a barcode recognition target area (ACT 118). The information acquisition unit 12 adds barcode data to the barcode file in the XML format to be stored in the HDD 103 according to the data format shown in FIG. 13 and save the file. The information acquisition unit 12 repeats the processing from the ACT 115. Then, if it is determined that the current page is the last page in ACT 115 (ACT 115: YES), the information acquisition unit 12 proceeds to ACT 119.

If it is determined that the current page is the last page in ACT 105, ACT 110, or ACT 115, the information acquisition unit 12 reads the image file and the barcode file from the HDD 103. The information acquisition unit 12 transfers the read image file and the barcode file to the file server 300 of the save destination via the network (ACT 119). When the transfer is completed, the information acquisition unit 12 displays the barcode scan execution screen G11 on the display 110. If the setting at the previous barcode scan execution is "Do not designate an area. Detect a barcode from the entire area in the page", the information acquisition unit 12 displays the barcode scan execution screen G11-1, if the setting at the previous barcode scan execution is "Scan the original document and detect the barcode position", the information acquisition unit 12 displays the barcode scan execution screen G11-2, and if the setting at the previous barcode scan execution is "Detect the area at the barcode position from the first page", the information acquisition unit 12 displays the barcode scan execution screen G11-3 on the display 110.

Figure 16:
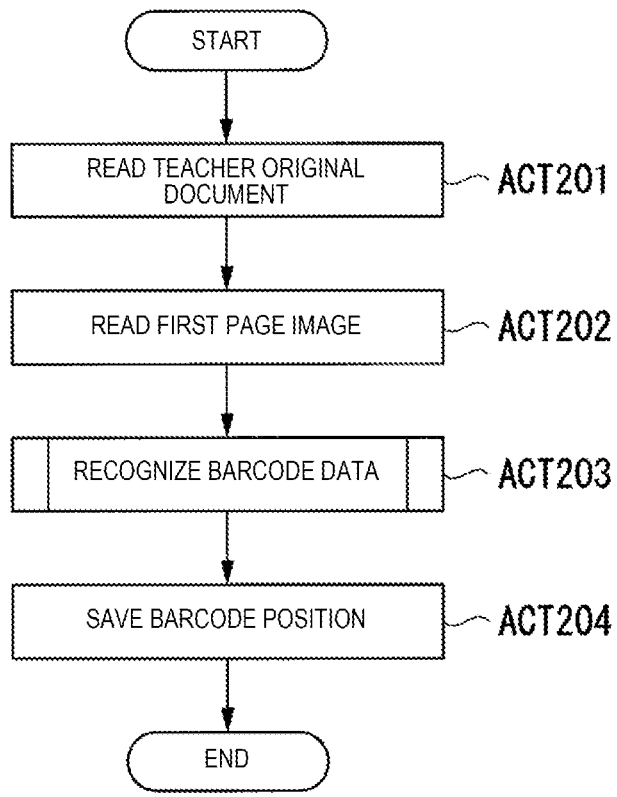
FIG. 16 is a flowchart showing teacher original document reading processing.

FIG. 16 is a flowchart showing teacher original document reading processing.

The scanner control unit 11 detects the start button B34 of the teacher original document barcode scan execution screen G31 (FIG. 9) being pressed. The scanner control unit 11 obtains scan settings set by the user in the teacher original document barcode scan execution screen G31. The scanner control unit 11 switches the display on the display 110 to the processing in progress screen G41 (FIG. 14). The scanner control unit 11 controls the scanner 105 to read the teacher original document according to the scan settings. The scanner control unit 11 converts the image information read by the scanner 105 into an electronic file and saves the file in the HDD 103 (ACT 201).

The information acquisition unit 12 reads the image information of one page from the file saved in the HDD 103 (ACT 202). The information acquisition unit 12 obtains barcode data by performing barcode data recognition processing of FIG. 16 which will be described later, with the entire area of one page as a barcode recognition target area (ACT 203). The information acquisition unit 12 adds the barcode data which is the recognition result of the barcode to the barcode file in the XML format to be stored in the HDD 103 according to the data format shown in FIG. 13. The information acquisition unit 12 extracts the coordinates of the start position of the barcode area and the coordinates of the end position from the barcode file and holds the coordinates in the memory 104 as mask variables (ACT 204). The information acquisition unit 12 displays the barcode scan execution screen G11-2 on the display 110.

When the scan setting is double-sided, the information acquisition unit 12 performs the processing of ACT 202 and ACT 203 for each of the front side and the back side. The information acquisition unit 12 adds information on the front side or the back side to the mask variables. When applying the mask variables to the image file of an original document to be read in the ACT 108 of FIG. 15, the mask variables of the front side are applied to the image file of the front side and the mask variables of the back are applied to the image file of the back side.

The control unit 10 may hold the mask variables held in the memory 104 in the ACT 204 in the HDD 103 in association with the teacher original document name input by the user. In this case, on the barcode area designation screen G21, the control unit 10 detects that the button B22 designating "Scan the original document and detect the barcode position" is selected and displays a teacher original document selection screen on the display 110. The teacher original document selection screen is a screen for selecting the teacher original document to be used from the list including a "new teacher original document" and the teacher original document name stored in the HDD 103. If the user selects the "new teacher original document", the control unit 10 displays the teacher original document barcode scan execution screen G31 on the display 110 and performs the teacher original document reading of FIG. 16. If the user selects one of the teacher original document names, the control unit 10 displays the barcode scan execution screen G11-2 on the display 110 and performs the barcode scanning of FIG. 15. The information acquisition unit 12 reads the mask variables of the selected teacher original document name from the HDD 103, holds the mask variables in the memory 104, and performs the processing of the ACT 108.

In addition, after the image processing apparatus 100 performs the ACT 101 of FIG. 15, the user may input a barcode detection area. The information acquisition unit 12 determines whether the processing in the ACT 102 is to be branched according to the input. When the user selects the teacher original document, the image processing apparatus 100 performs processing after ACT 107 after acquiring the mask variables by using the mask variables of the input teacher original document name or the new teacher original document.

Figure 17:
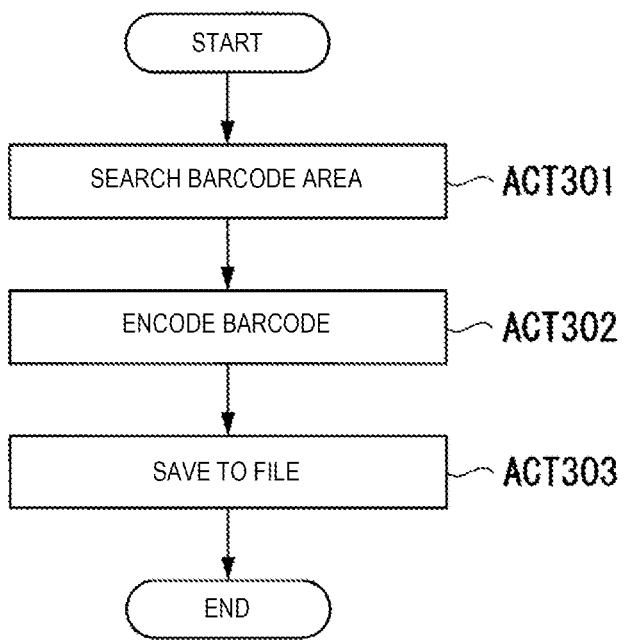
FIG. 17 is a flowchart showing barcode data recognition processing.

FIG. 17 is a flowchart showing barcode data recognition processing.

The information acquisition unit 12 searches a barcode pattern from the image information to be stored in the memory 104 (ACT 301). The barcode pattern is a pattern that matches the form of the barcode. When detecting the barcode pattern, the information acquisition unit 12 acquires the position information of the barcode area in which the barcode pattern is detected. The position information is represented by the coordinates of the start position and the end position of the barcode area. The information acquisition unit 12 holds mask variables (FIG. 12) in which the position information of the barcode area is set in the memory 104. The information acquisition unit 12 may set the coordinates of the start position and the end position of the area obtained by adding a predetermined margin to each of the upper, lower, left and right of the detected barcode area as mask variables.

The information acquisition unit 12 decodes and encodes the image information in the barcode area (ACT 302). The information acquisition unit 12 holds the encoded barcode recognition result in the memory 104. The information acquisition unit 12 generates an XML file in which the position information of the barcode area and the encoded barcode recognition result are set and saves the file in the HDD 103 as barcode data (FIG. 13) (ACT 303). If the decoding of the barcode image results in an error, the information acquisition unit 12 sets the barcode recognition result indicating the error in the barcode data.

In the barcode scanning, if the barcode recognition of the masked barcode area results in an error, the image processing apparatus 100 may perform barcode recognition for the entire page. This processing will be described with reference to FIGS. 18 and 19.

Figure 18:
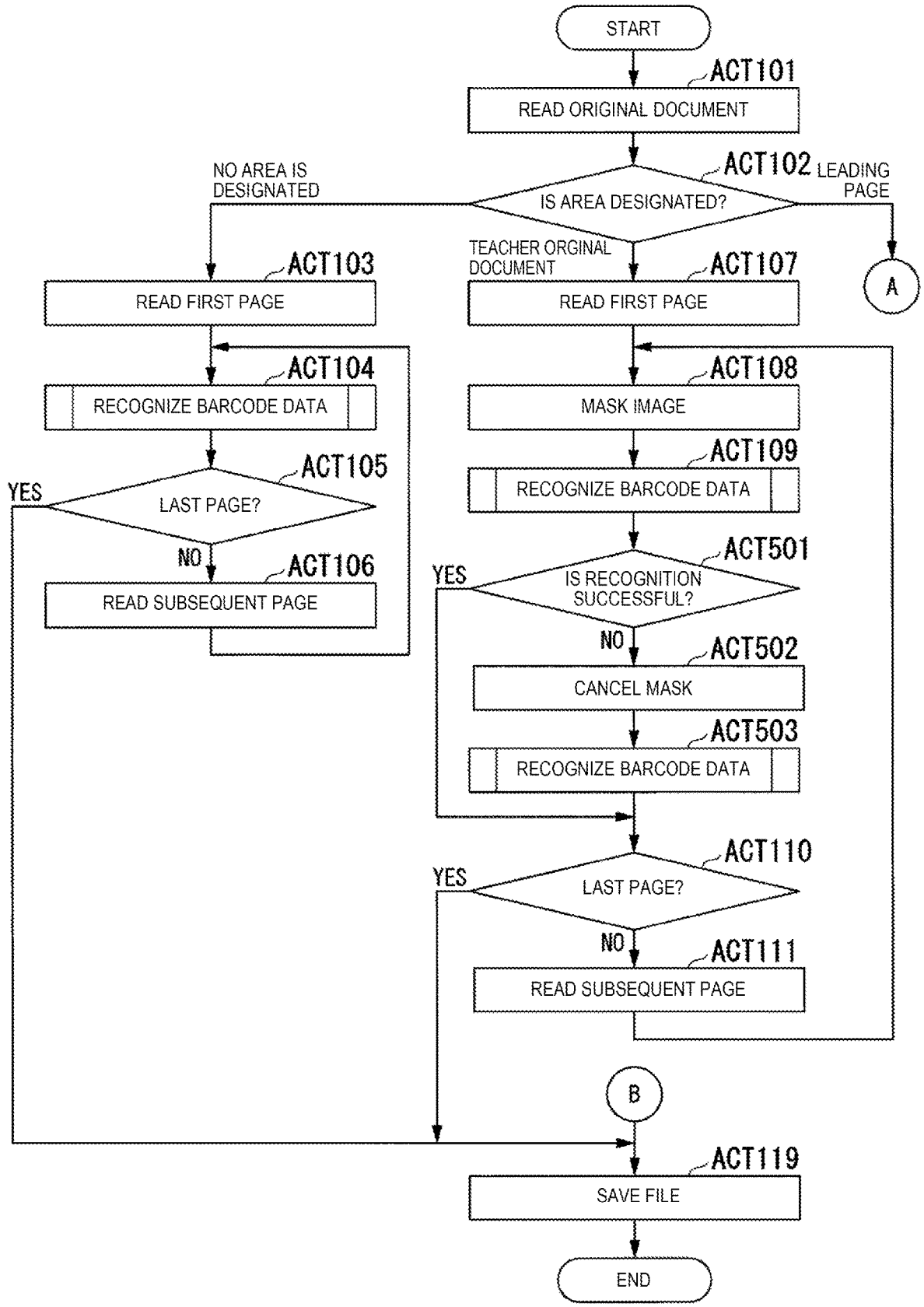
FIG. 18 is a flowchart showing barcode scanning.
Figure 19:
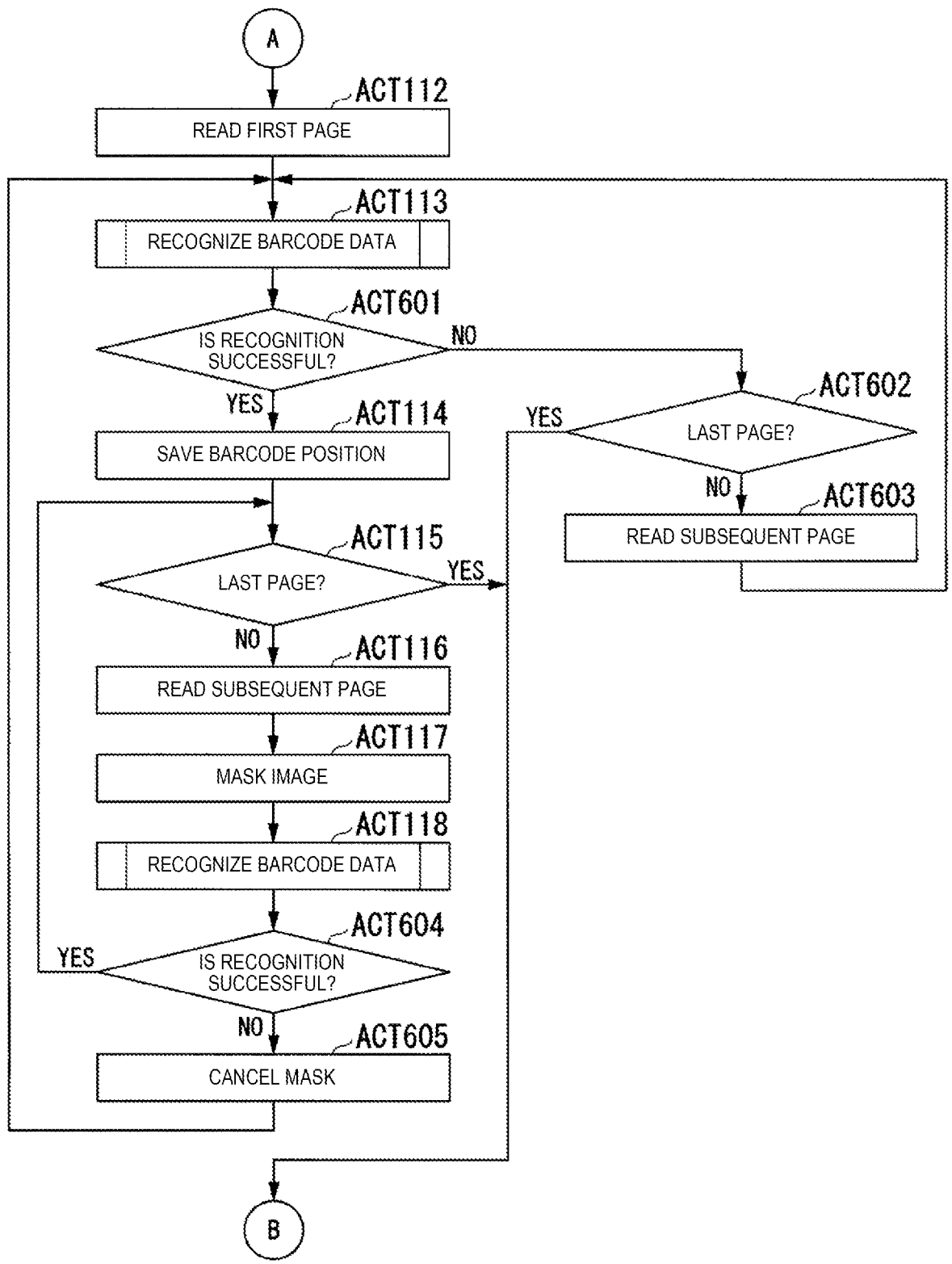
FIG. 19 is a flowchart showing barcode scanning.

FIGS. 18 and 19 are flowcharts showing another barcode scanning of the image processing apparatus 100. In FIGS. 18 and 19, the same steps as those shown in FIG. 11 are denoted by the same reference numerals, and a detailed description thereof will be omitted.

The processing of ACT 101 to ACT 106 shown in FIG. 18 is the same as the processing of FIG. 15. When the processing branches to a route of the teacher original document in ACT 102, the information acquisition unit 12 performs the processing of ACT 107 to ACT 109 in the same manner as the processing of FIG. 15. That is, the information acquisition unit 12 reads the mask variables obtained based on the teacher original document from the HDD 103. The information acquisition unit 12 reads the image information from the HDD 103, holds the image information in the memory 104, and reads the file of the first page from the image information (ACT 107). The information acquisition unit 12 masks the read image file by using the mask variables and extracts the barcode area image (ACT 108). The information acquisition unit 12 performs barcode data recognition processing on the extracted image (ACT 109).

The information acquisition unit 12 determines whether or not barcode data recognition of the ACT 109 is successful (ACT 501). If it is determined that the barcode data recognition is successful (ACT 501: YES), the information acquisition unit 12 adds the barcode data to the barcode file to be stored in the HDD 103 and saves the file. On the other hand, if it is determined that barcode data recognition of the ACT 109 is not successful (ACT 501: NO), the information acquisition unit 12 cancels the masking performed on the image file of the current page (ACT 502). The information acquisition unit 12 performs barcode data recognition processing with the entire area of the current page as a barcode recognition target area (ACT 503). The information acquisition unit 12 adds the barcode data obtained by the barcode data recognition processing of the ACT 503 to the barcode file in the XML format to be stored in the HDD 103 and saves the file.

If it is determined that the recognition of ACT 109 is successful (ACT 501: YES), or after the processing of ACT 503, the information acquisition unit 12 performs processing after ACT 110. In other words, if it is determined that the current page is not the last page (ACT 110: NO), the information acquisition unit 12 reads the file of the next page (ACT 111) and repeats the processing from the ACT 108. Then, if it is determined that the current page is the last page (ACT 110: YES), the information acquisition unit 12 proceeds to ACT 119.

When the processing branches to a route of the first page in the ACT 102, as shown in FIG. 19, the information acquisition unit 12 performs the processing of ACT 112 and ACT 113 in the same manner as the processing of FIG. 15. That is, the information acquisition unit 12 reads the image information from the HDD 103, holds the image information in the memory 104, and reads the file of the first page from the image information (ACT 112). The information acquisition unit 12 performs barcode data recognition processing on the entire area of the read file as a barcode recognition target area (ACT 113).

The information acquisition unit 12 determines whether or not barcode data recognition of the ACT 113 is successful (ACT 601). If it is determined that the barcode data recognition is not successful (ACT 601: NO), the information acquisition unit 12 determines whether or not the current page is the last page (ACT 602). If it is determined that the current page is not the last page (ACT 602: NO), the information acquisition unit 12 reads the file of the next page of the current page from the image information stored in the memory 104 (ACT 603). The information acquisition unit 12 repeats the processing from the ACT 113.

If it is determined that the barcode data recognition of ACT 113 is successful (ACT 601: YES), the information acquisition unit 12 performs processing of ACT 114 to ACT 118 in the same manner as in FIG. 15. That is, the information acquisition unit 12 adds barcode data to the barcode file to be stored in the HDD 103 and saves the file. The information acquisition unit 12 generates mask variables based on the information of the position where the barcode is detected in the ACT 113 and holds the variables in the memory 104 (ACT 114).

If it is determined that the current page is not the last page (ACT 115: NO), the information acquisition unit 12 reads the file of the next page from the image information (ACT 116). The information acquisition unit 12 extracts an image of the barcode area by using the mask variables generated in the ACT 114 into the read image file (ACT 117). The information acquisition unit 12 performs barcode data recognition processing with the extracted image as a barcode recognition target area (ACT 118).

The information acquisition unit 12 determines whether or not barcode data recognition of the ACT 118 is successful (ACT 604). If it is determined that the barcode data recognition is successful (ACT 604: YES), the information acquisition unit 12 adds the barcode data to the barcode file to be stored in the HDD 103 and saves the file. The information acquisition unit 12 repeats the processing after the ACT 115.

On the other hand, if it is determined that barcode data recognition of the ACT 118 is not successful (ACT 605: NO), the information acquisition unit 12 cancels the masking performed on the image file of the current page (ACT 605). The information acquisition unit 12 performs processing from the ACT 113. As a result, the information acquisition unit 12 performs barcode data recognition processing with the entire area of the current page as a barcode recognition target area.

After the processing of ACT 106, if it is determined that the current page is the last page in ACT 115 (ACT 115: YES), or it is determined that the current page is the last page in ACT 602 (ACT 602: YES), the information acquisition unit 12 proceeds to the ACT 119 in FIG. 18. The information acquisition unit 12 reads the image file and the barcode file from the HDD 103 and transfers the image file and the barcode file to the file server 300 of the save destination via the network (ACT 119).

In the above description, the case where the encoded image is a barcode has been described as an example, but the encoded image may be other than barcode. The information acquisition unit 12 searches the entire page and detects a feature indicating an area including the encoded image. The feature to be detected may be a feature of the encoded image itself or a feature of another image formed around the encoded image. The feature is, for example, shape, color, or a combination of shape and color. Based on the detected feature, the information acquisition unit 12 detects the area including the encoded image and decodes the encoded image in the area according to a predetermined decoding rule.

A part of the functions of the image processing apparatus 100 in the above-described embodiment may be realized by a computer. In that case, the part of the functions may be realized by recording a program for realizing this function on a computer-readable recording medium and causing the computer system to read and execute the program recorded on the recording medium. The "computer system" referred to here includes hardware such as an OS and peripheral devices. In addition, "the computer-readable recording medium" is, for example, a portable medium such as a flexible disk, a magneto-optical disk, a ROM, a CD-ROM or the like, or a storage device such as a hard disk built in the computer system. Further, the "computer-readable recording medium" may include a medium that dynamically holds a program for a short period of time, such as a communication line when a program is transmitted via a network such as the Internet or a communication line such as a telephone line, and a medium that holds a program for a certain period of time, such as a volatile memory inside the computer system serving as a server or client in that case. In addition, the above program may be for realizing a part of the above-described functions and further, may be realized by combining the above-described function with a program already recorded in the computer system.

According to at least one embodiment described above, by having the control unit 10, it is possible to shorten the time required to read the encoded image from the sheet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a scanner configured to read an image including at least one encoded image on at least one of a plurality of sheets;
   a control panel operable to receive an input selecting between a first setting and a second setting, wherein the second setting designates a different detection method of the at least one encoded image than a detection method used in the first setting;
   a storage device configured to store information; and
   a control unit configured to:
   in response to receiving a selection of the first setting, determine a detection area of an encoded image based on an image read from a first sheet of a plurality of sheets to be read, detect an encoded image in the determined detection area in each of the plurality of sheets to be read, decode the detected encoded image, and
   in response to receiving a selection of the second setting, determine a detection area of an encoded image based on a teacher image from a teacher sheet, record information indicating the detection area in the storage device, detect an encoded image in the determined detection area in a sheet different from the teacher sheet, decode the detected encoded image.

2. The image processing apparatus of claim 1, wherein the control panel operable to receive an third setting to process an entire area in a page without specifying a detection area, and wherein the control unit is operable to detect an encoded image from the entire area.

3. The image processing apparatus of claim 1, wherein the scanner reads the image including at least one encoded image on a sheet as digital information; and
   wherein the control unit is further operable to apply a mask in the digital information of the image including at least one encoded image by using at least one mask variable determined from the detection area and extract the encoded image therein.

4. The image processing apparatus of claim 3, wherein the control unit cancels the mask when the encoded image is not successfully extracted.

5. The image processing apparatus of claim 4, wherein the control unit continues to process the at least one sheet until a last sheet is detected.

6. The apparatus according to claim 1, wherein the control unit detects an encoded image from an area different from the detection area in the image when the encoded image may not be decoded in the detection area.

7. The apparatus according to claim 1, wherein the encoded image is a barcode.

8. A method performed by a computer of an image processing apparatus, the method comprising:
   receiving an input selecting between a first setting and a second setting, wherein the second setting designates a different detection method of an at least one encoded image on at least one of a plurality of sheets than a detection method used in the first setting;
   in response to receiving the input corresponding to the first setting, determining a detection area of an encoded image based on an image read from a first sheet of the plurality of sheets to be read by a scanner that reads an image on a sheet; detecting an encoded image in the determined detection area in each of the plurality of sheets to be read, decoding the detected encoded image; and
   in response to receiving a selection of the second setting, determining a detection area of an encoded image based on a teacher image which is an image read from a predetermined teacher sheet by the scanner that reads an image on a sheet; recording information indicating the detection area in a storage device; detecting an encoded image in the determined detection area in a sheet different from the predetermined teacher sheet; decoding the detected encoded image.

9. The method of claim 8, wherein the teacher image is compiled from two or more read pages of a document.

10. The method of claim 8, further comprising saving the decoded encoded image to a memory device of the image processing apparatus.

11. The method of claim 8, wherein receiving the input selecting between the first setting and the second setting comprises receiving, when the first setting is selected, a first instruction to detect the detection area from a first page, or receiving, when the second setting is selected, a second instruction to detect the detection area from the at least two pages of a document.

12. The method of claim 11, wherein the encoded image includes a barcode.

\* \* \* \* \*